(12) United States Patent
Heinz et al.

(10) Patent No.: US 11,535,223 B2
(45) Date of Patent: Dec. 27, 2022

(54) METHOD TO CHECK FOR DISTURBANCES IN AN ELECTRONICALLY SLIP-CONTROLLABLE BRAKE SYSTEM FOR A MOTOR VEHICLE

(71) Applicant: Robert Bosch GmbH, Stuttgart (DE)

(72) Inventors: Benjamin Heinz, Eberstadt (DE); Lukas Schweizer, Flein (DE); Michael Reichert, Freiberg Am Neckar (DE); Michael Robert Ippolito, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 16/704,108

(22) Filed: Dec. 5, 2019

(65) Prior Publication Data

US 2020/0180579 A1 Jun. 11, 2020

(30) Foreign Application Priority Data

Dec. 6, 2018 (DE) .......................... 102018221079.9

(51) Int. Cl.
| | |
|---|---|
| *B60T 17/22* | (2006.01) |
| *B60T 13/66* | (2006.01) |
| *B60T 8/176* | (2006.01) |
| *F16D 65/16* | (2006.01) |
| *B60T 17/04* | (2006.01) |
| *F15B 21/044* | (2019.01) |

(Continued)

(52) U.S. Cl.
CPC ............ *B60T 13/662* (2013.01); *B60T 8/176* (2013.01); *B60T 17/04* (2013.01); *B60T 17/221* (2013.01); *F15B 21/044* (2013.01); *F16D 65/16* (2013.01); *B60T 2270/406* (2013.01); *F16D 2065/781* (2013.01); *F16D 2066/006* (2013.01)

(58) Field of Classification Search
CPC ...... F15B 21/044; B60T 13/74; B60T 13/745; B60T 2270/406; B60T 17/221; B60T 17/222
See application file for complete search history.

(56) References Cited

U.S. PATENT DOCUMENTS

| | | | | |
|---|---|---|---|---|
| 6,679,569 | B2 * | 1/2004 | Schmidt | ................. B60T 7/042 |
| | | | | 303/122.1 |
| 6,729,698 | B2 * | 5/2004 | Kusano | ................ B60T 13/662 |
| | | | | 303/191 |

(Continued)

*Primary Examiner* — Bradley T King
(74) *Attorney, Agent, or Firm* — Norton Rose Fulbright US LLP; Gerard Messina

(57) ABSTRACT

A method is provided to check for presence of gas bubbles in an electronically slip-controllable motor vehicle brake system that includes brake circuits to which wheel brakes are connected, a pressure generator to charge the brake circuits with a brake pressure, and sensors to detect an actuating signal of the pressure generator and measure the brake pressures in the brake circuits. Disturbances are recognized by ascertaining from the signal a setpoint value for a brake pressure to be obtained and comparing it to an actual value of the brake pressure or by determining that an actual volume of the pressurizing medium displaced into the brake circuits, ascertainable from the signal, is greater than a limiting value that is determined for a setpoint value for the pressurizing-medium volume to be displaced into the brake circuits in order to generate the actual value of the brake pressure.

8 Claims, 3 Drawing Sheets

(51) Int. Cl.
  *F16D 66/00*   (2006.01)
  *F16D 65/78*   (2006.01)

(56) References Cited

U.S. PATENT DOCUMENTS

| | | | |
|---|---|---|---|
| 6,927,681 B2* | 8/2005 | Yoshino | B60T 17/221 |
| | | | 303/122.1 |
| 7,168,771 B2* | 1/2007 | Nakano | G01L 5/28 |
| | | | 303/191 |
| 2003/0192376 A1* | 10/2003 | Nakano | G01L 5/28 |
| | | | 73/121 |
| 2004/0090347 A1* | 5/2004 | Yoshino | B60T 17/221 |
| | | | 340/933 |
| 2006/0138861 A1* | 6/2006 | Buschmann | B60T 8/4081 |
| | | | 303/122.08 |
| 2014/0316643 A1* | 10/2014 | Svensson | B60T 13/662 |
| | | | 701/33.9 |
| 2018/0126971 A1* | 5/2018 | Leiber | B60T 13/686 |
| 2019/0344767 A1* | 11/2019 | Bareiss | B60T 7/12 |
| 2021/0122349 A1* | 4/2021 | Leiber | B60T 7/042 |
| 2021/0245725 A1* | 8/2021 | Courth | G01M 17/00 |
| 2021/0276523 A1* | 9/2021 | Stebner | B60T 8/4872 |

* cited by examiner

METHOD TO CHECK FOR DISTURBANCES IN AN ELECTRONICALLY SLIP-CONTROLLABLE BRAKE SYSTEM FOR A MOTOR VEHICLE

CROSS-REFERENCE TO RELATED APPLICATIONS

The present application claims priority under 35 U.S.C. § 119 to DE 10 2018 221 079.9 filed in the Federal Republic of Germany on Dec. 6, 2018, the content of which is hereby incorporated by reference herein in its entirety.

FIELD OF THE INVENTION

The present invention relates to a method to check for disturbances in an electronically slip-controllable brake system for a motor vehicle.

BACKGROUND

Electronically slip-controllable brake systems of motor vehicles are well known in the marketplace, and are often also referred to as antilock braking (ABS-), traction (TCS-) or stability (ESP-) control systems.

Slip-controllable brake systems share in common that during braking procedures, they are able to adjust the brake pressure in the wheel brakes to the slip conditions prevailing at the respectively assigned wheels, and thus to prevent these wheels from locking. As a result, the vehicle remains steerable during the braking procedures and in addition, by targeted control of the brake pressure of the individual wheel brakes, can be transferred into and maintained in a stable driving condition.

In the brake systems indicated above, a brake pressure can be generated by the driver through muscular energy, or alternatively, the driver can merely specify a braking command, which is then set by a pressure generator driven by non-muscular energy. In principle, the invention described below can be applied equally to both variants of brake systems.

Mainly in the case of heavy motor vehicles or in the case of sports cars, very high temperatures can occur at the wheel brakes when heavy demands are placed on the brake system like, e.g., during downhill driving and on race tracks. Correspondingly, the temperature of the brake fluid present in the wheel brakes increases, as well. In that case, depending on the state of aging or the water content of this brake fluid, its boiling point can be exceeded, so that the brake fluid vaporizes and gas bubbles can accumulate in the brake circuits. Gas bubbles are compressible under pressure, with the result that the volume of pressurizing medium displaced into the wheel brakes during braking procedures does not necessarily lead to a corresponding buildup of brake pressure.

Problems with the gas bubbles manifest negatively especially in the case of a diagonal or X brake-circuit configuration, since the high heat input takes place mainly via the more powerful wheel brakes at one of the two vehicle axles. In principle, it can be the front axle or the rear axle of a vehicle. Therefore, in the case of an X brake-circuit configuration, both brake circuits are possibly encumbered with unwanted gas bubbles, while in the case of a parallel or II brake-circuit configuration, only the more powerful wheel brakes at one of the vehicle axles are affected, and the less stressed wheel brakes of the other vehicle axle function unchanged.

In brake circuits polluted with gas bubbles, an increase in brake pressure is only possible by delivering additional pressurizing medium into the brake circuits.

SUMMARY

An object of the present invention is to provide a method by which disturbances in the brake circuits are detectable automatically.

Vehicles having brake systems in which the extent of an actuation of the pressure generator is detectable by a sensor system and is able to be supplied to an electronic control unit for evaluation, are potentially suited to recognize the cases of disturbance indicated above and to control countermeasures to be initiated if necessary.

An example of a method forming a basis of the present invention is described in detail below. The invention is illustrated using the drawing.

DETAILED DESCRIPTION

Figure 1:
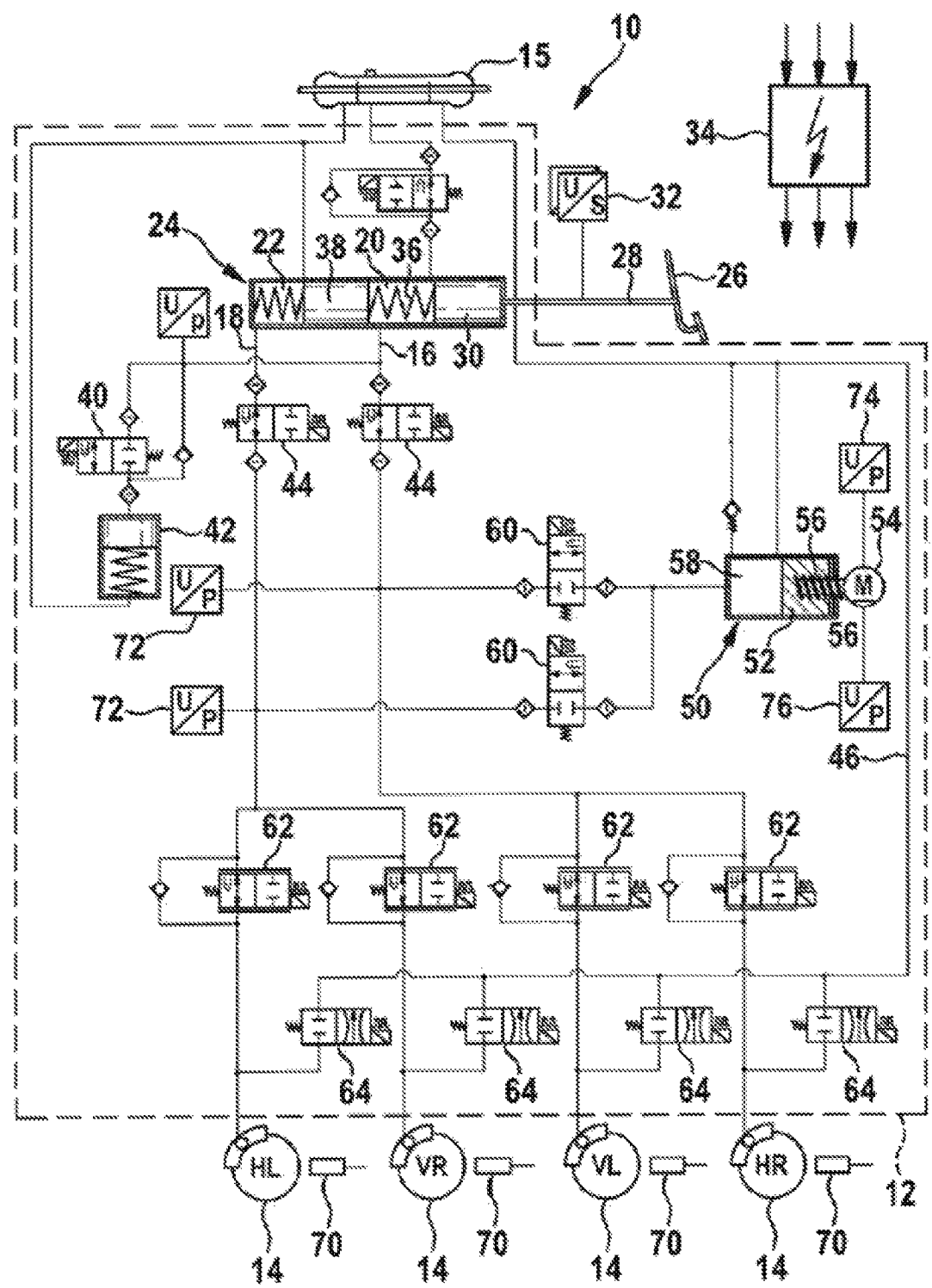
FIG. 1 is a hydraulic circuit diagram of a brake system according to an example embodiment of the present invention.

FIG. 1 shows a hydraulic circuit diagram of an electronically slip-controllable brake system 10. The latter, by way of example, is a brake system known from the related art, in which brake pressure is built up by non-muscular energy, and whose design and outfitting with components controlling the pressurizing medium are therefore explained only to the extent necessary to comprehend the invention. The invention, however, is not limited to such power-brake systems, but rather is also applicable in principle to brake systems in which the brake pressure is built up by muscular energy.

Brake system 10 shown in FIG. 1 is divided into a hydraulic unit 12 with wheel brakes 14 connected to it, and into a pressurizing-medium reservoir 15 likewise connected. A total of four wheel brakes 14 are present, which in each case are supplied by pairs with pressurizing medium via two available brake circuits 16 and 18. In this instance, the two brake circuits 16; 18 are distributed diagonally over two axles of a vehicle. That is, one of wheel brakes 14 of a brake circuit 16; 18 is located at a front axle of the vehicle, while the other wheel brake 14 of the same brake circuit 16; 18 is disposed at a rear axle of the vehicle, and at the same time, diagonally opposite wheel brake 14 of the front axle. Therefore, a first brake circuit 16, for example, contacts a wheel brake 14 front left (VL) with a wheel brake rear right (HR), and a second brake circuit 18 contacts a wheel brake 14 front right (VR) with a wheel brake 14 rear left (HL) of the vehicle.

In each case one of the two brake circuits 16; 18 of brake system 10 is connected to in each instance one of a total of two pressurizing-medium chambers 20; 22 of a brake master cylinder 24. In the example embodiment, the latter is likewise accommodated in hydraulic unit 12. Each of pressurizing-medium chambers 20; 22 is in turn connected to pressurizing-medium reservoir 15. Brake master cylinder 24 is operable by the driver using an actuating mechanism 26 in the form of a pedal, for example. To that end, the pedal is connected via a coupling rod 28 to what is referred to as a rod piston 30 of brake master cylinder 24.

The driver specifies a braking command by actuating the pedal. This braking command manifests itself in an actuating travel of coupling rod 28, which is ascertained by a first sensor device 32 detecting the actuating travel of coupling rod 28, and is supplied to an electronic control unit 34 of brake system 10. A rod-piston spring 36, with which rod piston 30 is braced against a float piston 38 of brake master cylinder 24, transfers the displacement of rod piston 30 to float piston 38.

Pressurizing-medium chamber 20 of brake master cylinder 24 assigned to rod piston 30 is coupled via a pressurizing-medium connection, controllable by a simulator control valve 40, to a simulator device 42, in which the pressurizing medium displaced from pressurizing-medium chamber 20 of brake master cylinder 24 is buffered in the event the pedal is actuated.

Pressurizing-medium chambers 20 and 22 of brake master cylinder 24 assigned to rod piston 30 and float piston 38 are in each case controllably connected to one of brake circuits 16; 18. Electronically controllable isolating valves 44 are provided in hydraulic unit 12 to control the two pressurizing-medium connections. In the normal state of brake system 10, the connection of pressurizing-medium chambers 20 and 22 to brake circuits 16; 18 is interrupted and the pressurizing-medium connection of pressure chamber 20 to simulator device 42 is open.

In this normal state, a brake pressure in brake circuits 16; 18 proportional to the braking command is provided by a pressure generator 50, inter alia, as a function of the signal from sensor device 32. Pressure generator 50 is contacted in parallel to brake master cylinder 24 with brake circuits 16; 18. In the case shown, a plunger device is used as pressure generator 50, in which a floating piston 52 is driven to a linear movement by a controllable motor 54 via a downstream gear unit 56. This pressure generator 50 displaces the pressurizing medium out of a plunger working chamber 58 into brake circuits 16; 18. Electronically controllable plunger control valves 60 are provided to control connections between brake circuits 16; 18 and pressure generator 50.

In each case downstream of plunger control valves 60 and isolating valves 44, brake system 10 has a pressure-modulation device. It is made up in each case of one assigned electronically controllable pressure buildup valve 62 and one similar pressure relief valve 64 per wheel-brake cylinder 14. By suitable electronic control, pressure buildup valves 62 and pressure relief valves 64 make it possible to adjust the wheel-brake pressure prevailing in individual wheel brakes 14 to the slip conditions at the respective assigned wheel. Slippage possibly occurring at this wheel is detected by an assigned wheel-speed sensor 70 on the basis of a decreasing wheel speed. If the wheel threatens to lock, the brake pressure is reduced.

To regulate the brake pressure in wheel brakes 14, brake system 10 is fitted with further sensor devices. Sensor devices 72 detect the brake pressure in each of brake circuits 16; 18; a sensor device can be provided to detect a deceleration or acceleration of the vehicle; as explained above, additional sensor devices 70; 74; 76 evaluate a rotational behavior of the wheels as well as the drive of pressure generator 50. The signals of sensor devices 70-76 are fed to electronic control unit 34, which calculates from them a variable drive signal to motor 54 of pressure generator 50 and to described valves 40; 44; 60; 62; 64. To that end, among other things, a pressure-volume setpoint characteristic of brake system 10 is stored in electronic control unit 34. This characteristic indicates the setpoint curve of a rise in pressure as a function of the pressurizing medium displaced by pressure generator 50 into brake circuits 16; 18 under ideal conditions of brake system 10, and therefore forms a suitable reference for a comparison to the actual curve of the brake pressure ascertained in reality from the signals of sensor devices 72.

Figure 2:
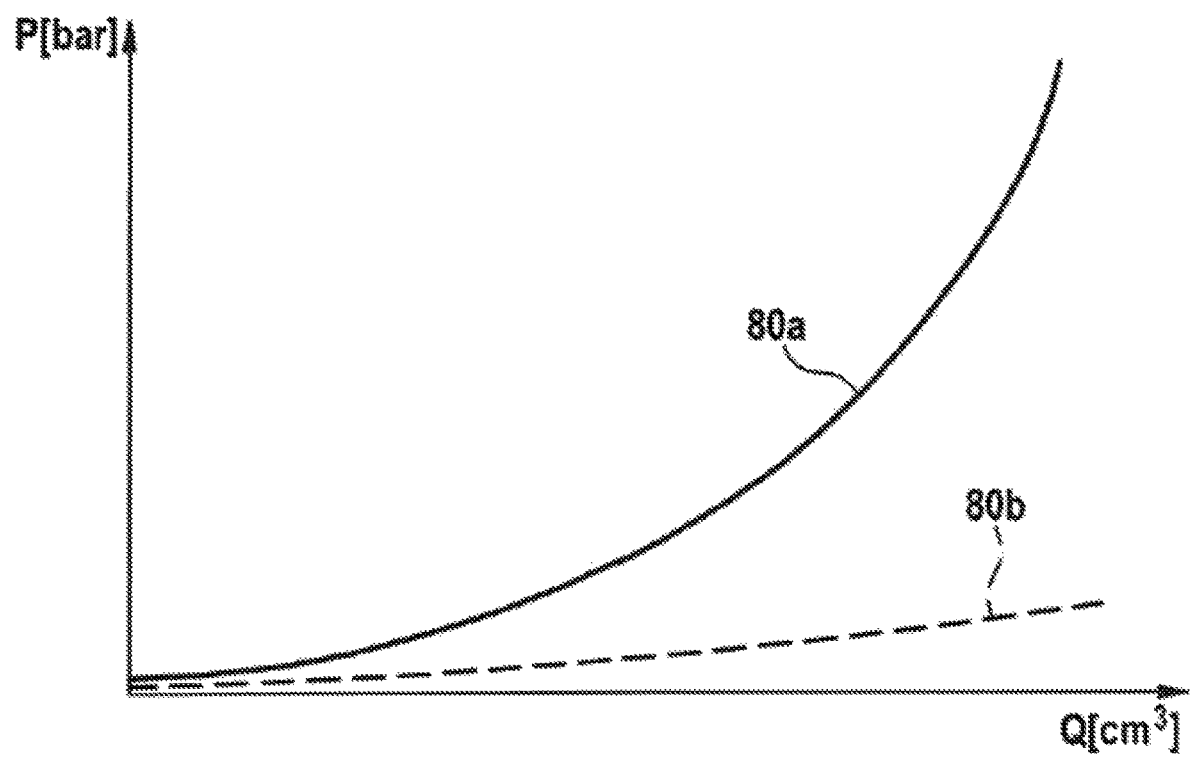
FIG. 2 shows characteristic curves that illustrate a pressure buildup over a volume of pressurizing medium, displaced by the pressure generator, in the brake circuits under various operating states of the brake system, according to an example embodiment of the present invention.

FIG. 2, using a pressure-volume diagram, shows the course of a buildup in brake pressure in one of the two brake circuits 16; 18 of brake system 10 according to FIG. 1. In this case, the buildup in brake pressure is plotted over pressurizing-medium volume Q displaced by pressure generator 50 into brake circuit 16; 18.

In a first operating state of brake system 10, brake circuit(s) 16; 18 is/are in the intended state, that is, brake circuit 16; 18 is not contaminated by trapped gas bubbles. With the beginning of the displacement of pressurizing medium by pressure generator 50, the brake pressure in brake circuit 16; 18 therefore increases steadily and with a rising pressure gradient. Characteristic 80a is shown as a solid line and indicates the pressure-volume setpoint characteristic.

A second operating state of brake system 10 is present when brake circuit 16; 18 is polluted with gas bubbles. Under these conditions, beginning with displacement of pressurizing medium, at first the brake pressure does not increase at all or only minimally, because the existing compressibility of the gas bubbles counteracts or prevents such a rise in brake pressure. Only with increasing displacement of pressurizing medium into brake circuits 16; 18 does the compressibility of the trapped gas bubbles gradually decrease, so that a delayed rise in pressure (dashed characteristic 80b) is obtained. In this instance, however, the gradient of this rise in pressure is markedly less than in the case of previously described characteristic 80a, and as a result, the actual value reached at a specific displaced volume of pressurizing medium lies below the setpoint value for the brake pressure according to characteristic 80a. Therefore, a disturbance present in brake system 10 is determinable by a comparison of the two characteristics 80a, 80b, that is, on the basis of existing deviations. Characteristic 80b indicates an exemplary actual pressure-volume characteristic of a brake system 10.

If, for example, after determining a disturbance present in brake system 10, information about the temperature of brake system 10 available in electronic control unit 34 is utilized, then a temperature signal that lies above a determinable limiting value can be viewed as an indicator for a high probability of gas bubbles trapped in brake circuits 16; 18. High temperatures of brake system 10 cause the hollow spaces guiding pressurizing medium to expand, and as a result, a greater volume of pressurizing medium must be displaced in order to adjust a specific brake pressure. Accordingly, the volume of pressurizing medium to be displaced into the wheel brakes for a predetermined brake pressure increases in proportion to the temperature of the brake system. A temperature model based on this effect and likewise stored in electronic control unit 34 therefore allows conclusions to be drawn about the temperature existing in brake system 10 or its components.

Figure 3A:
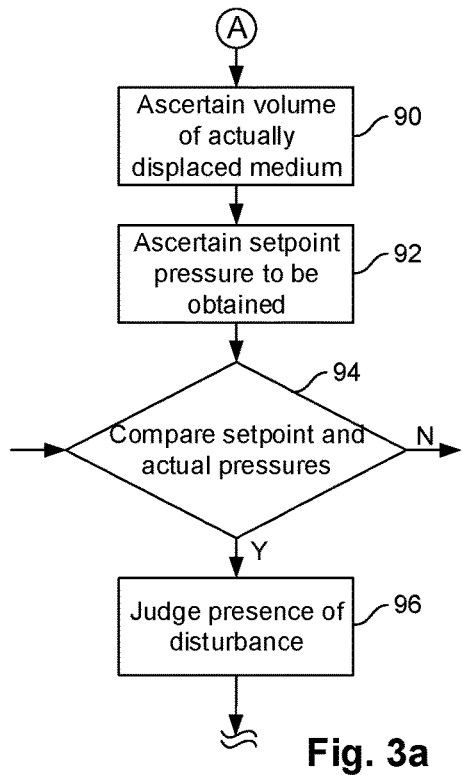
FIGS. 3a-3c provides a flowchart that illustrate a method according to an example embodiment of the present invention.
Figure 3B:
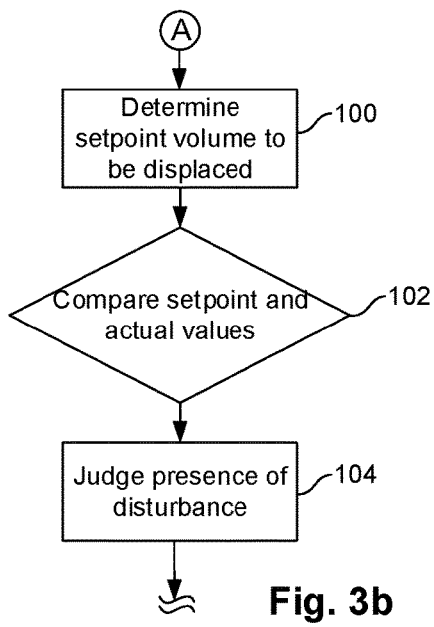
Figure 3C:
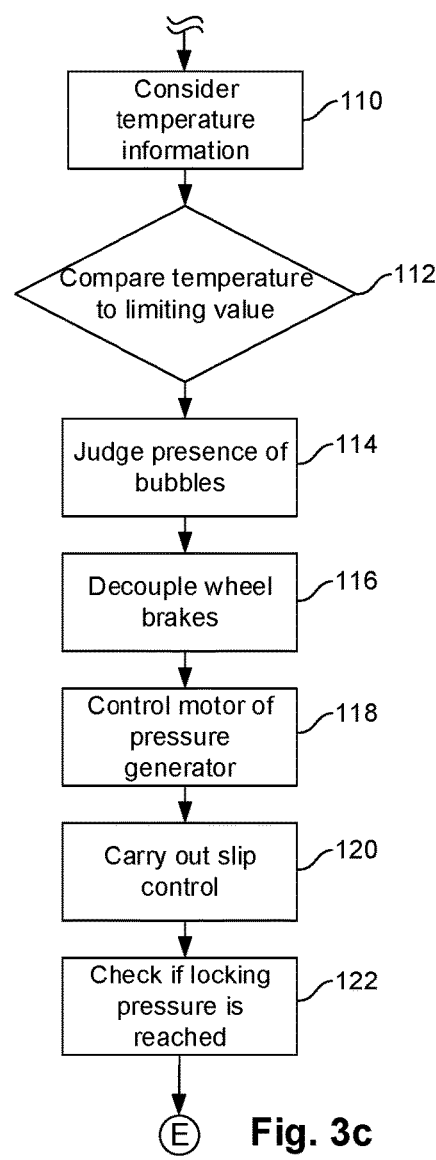

FIGS. 3a-3c illustrate, inter alia, two alternative exemplary variants for a method underlying the present invention. Both testing methods are based on determining and evaluating the volume of pressurizing medium displaced into brake circuits 16; 18 for a buildup in brake pressure. This volume of pressurizing medium traces back ultimately to the braking command of the driver and therefore to the actuating travel of actuating mechanism 26. In the case of electronically slip-controllable brake systems 10 that are actuated by muscular energy, as explained above, the pressurizing medium is displaced by a mechanical actuation of brake master cylinder 24 coupled to actuating mechanism 26, and in the case of vehicle brake systems actuated by non-muscular energy, according to FIG. 1, by the electronic control of the drive of pressure generator 50. Accordingly, an actual value for the pressurizing-medium volume Q(actual) displaced in reality into brake circuits 16; 18 is ascertainable in step 90 from the actuating signal of respective pressure generator 50 detected by sensor device 76.

After the volume of pressurizing medium Q(actual) displaced into brake circuits 16; 18 is determined, in a following step 92, a setpoint value for a brake pressure p(setpoint) to be obtained in brake circuits 16; 18 is ascertained utilizing the stored pressure-volume setpoint characteristic. Subsequently, in step 94, this setpoint value for brake pressure p(setpoint) is compared to the actual value for brake pressure p(actual) measured in reality by sensor device 72. If this comparison reveals that the actual value for brake pressure p(actual) is lower than a minimal limiting value for the ascertained setpoint value of brake pressure p(setpoint-min) determinable by electronic control unit 34, in step 96, a disturbance is judged to be present in brake circuits 16; 18.

As an alternative to this procedure, according to FIG. 3b, given at least substantial agreement of the setpoint value for brake pressure p(setpoint) with the actual value measured for brake pressure p(actual), with step 100, the setpoint value—assigned to the present actual value for brake pressure p(actual)—for pressurizing-medium volume Q(setpoint) to be displaced by pressure generator 50 into brake circuits 16; 18 can be determined from pressure-volume setpoint characteristic 80a stored in electronic control unit 34. In a following step 102, this ascertained setpoint value for pressurizing-medium volume Q(setpoint) is compared to an actual value for the displaced pressure-medium volume Q(actual) ascertainable from the actuating signal of pressure generator 50. If this comparison reveals that the actual value for the displaced volume of pressurizing medium Q(actual) is greater than an upper limiting value, determinable by electronic control unit 34, for the volume of pressurizing medium Q(setpoint) to be displaced into brake circuits in order to generate the prevailing brake pressure p(actual), in step 104, a disturbance is likewise judged to be present in brake circuits 16; 18.

After a disturbance has been determined (step 96 or step 104), according to FIG. 3c, information about the temperature of the brake system available from the electronic control unit is considered (step 110). If query 112 reveals that this temperature exceeds a determinable temperature limiting value, in step 114, it is judged with high probability that gas bubbles are present in brake circuits 16; 18.

In response to the probable presence of gas bubbles, in step 116, wheel brakes 14 of in each case one of the axles of the vehicle are decoupled from their respective brake circuits 16; 18. It is that one of the two axles at which wheel brakes 14 of the vehicle are located that are more powerful for reasons of design. Specifically, in order to decouple these wheel brakes 14, respectively assigned pressure buildup valves 62 are driven by electronic control unit 34 in such a way that these pressure buildup valves 62 assume their closed position and consequently, from then on, interrupt the pressurizing-medium connection of these wheel brakes 14 to brake circuits 16; 18. The less powerful wheel brakes 14 of the respective other axle remain contacted, unchanged, with brake circuits 16; 18, and continue to be supplied with pressurizing medium by pressure generator 50. At the same time, motor 54 of this pressure generator 50 is controlled in such a way by electronic control unit 34 (measure 118), that a higher volume of pressurizing medium is delivered to contacted wheel brakes 14 compared to conventional deliveries of pressurizing medium. The goal is to increase the brake pressure in wheel brakes 14 contacted with brake circuits 16; 18 as quickly as possible until the locking pressure level of the wheels is reached.

If the locking pressure level has been reached, in step 120, a slip control is carried out in a manner known from the related art using pressure buildup valves 62 and pressure relief valves 64 of these wheel brakes 14. Alternatively, it would be possible to carry out this slip control in wheel brakes 14 only by a control of pressure buildup valves 62, thus, without involvement of pressure relief valves 64. An advantage of the latter variant is an increased pressure buildup dynamic, since in this case, pressure generator 50 only sucks pressurizing medium out of pressurizing-medium reservoir 15.

If a subsequently following check 122 reveals that the locking pressure level at one of the axles is already reached, the delivery volume of pressure generator 50 can be provided to wheel brakes 14 of the axle decoupled up to that point, until finally wheel brakes 14 at both axles have reached their locking pressure level. To that end, electronic control unit 34 controls pressure buildup valves 62 of wheel brakes 14, decoupled up to now, back again into their open position.

The method described is ended as soon as there is no longer a demand for brake pressure, e.g., when the driver withdraws an actuation of actuating mechanism 26.

Modifications of or supplements to the example embodiment described are possible without departing from the stated idea of the invention.

What is claimed is:

1. A method for an electronically slip-controllable brake system of a motor vehicle, wherein the brake system includes a plurality of mutually separate brake circuits configured to supply connected wheel brakes with pressurizing medium, an actuatable pressure generator configured to charge the brake circuits with a brake pressure, sensor devices configured to generate an actuating signal quantifying an actuation of the pressure generator and to measure an actual value of the brake pressure in at least one brake circuit, and an electronic control unit configured to evaluate the signal generated by the sensor devices, the method comprising:
  determining that a disturbance exists if:
    the measured actual value of the brake pressure is less than a limiting value that is determined by the electronic control unit for a setpoint value for the brake pressure to be obtained in the brake circuits, which setpoint value is ascertained based on the actuating signal; or
    an actual value of a volume of the pressurizing medium that is displaced into the brake circuits, which ascertainable from the actuating signal, is greater than a limiting value that is determined by the electronic control unit for a setpoint value for the pressurizing-medium volume to be displaced into the brake circuits in order to generate the actual value of the brake pressure; and in response to the determination of the existence of the disturbance, closing inlets by which the pressurizing medium is suppliable to a first subset of the wheel brakes and subsequently performing at least one of the following two steps (a)-(b):

(a) in response to a wheel locking pressure being reached at a second subset of the wheel brakes, reopening the inlets by which the pressurizing medium is suppliable to the first subset of the wheel brakes; and (b) based on the determination of the existence of the disturbance, performing a slip control of the second subset of the wheel brakes by switching open and close states of only inlets by which the pressurizing medium is suppliable to the second subset of the wheel brakes with no switching of states of relief valves by which the pressurizing medium is removable from the second subset of the wheel brakes, wherein the electronically slip-controllable brake system is configured to switch the states of the relief valves for the slip control when the disturbance is not determined to exist.

2. The method of claim 1, wherein the disturbance is presence of gas bubbles.

3. The method of claim 1, further comprising:

in an event that the disturbance is determined to be present in the brake system:

comparing an actual value of a temperature of the brake system to a limiting temperature value; and responsive to a result of the comparison being that the actual value of the temperature is greater than the limiting temperature value for the temperature, determining that the disturbance includes presence of gas bubbles in the brake circuits.

4. The method of claim 3, wherein the first subset of the wheel brakes includes all of those of the wheel brakes that are of a same one of a plurality of axles of the vehicle.

5. The method of claim 1, wherein a brake pressure in the second subset of the wheel brakes is built up with a pressure increase that is accelerated compared to a pressure increase implemented when the disturbance is not determined to exist, the accelerated pressure increase being implemented by an adjusted control of a drive of the pressure generator.

6. The method of claim 1, wherein, subsequent to the closure of the inlets by which the pressurizing medium is suppliable to the first subset of the wheel brakes, the reopening of the inlets by which the pressurizing medium is suppliable to the first subset of the wheel brakes is performed in response to the wheel locking pressure being reached at the second subset of the wheel brakes.

7. The method of claim 6, wherein:

the electronically slip-controllable brake system is configured to switch the states of the relief valves by which the pressurizing medium is removable from the second subset of the wheel brakes for the slip control when the disturbance is not determined to exist; and subsequent to the closure of the inlets by which the pressurizing medium is suppliable to the first subset of the wheel brakes, based on the determination of the existence of the disturbance, the slip control of the second subset of the wheel brakes is performed by switching open and close states of only the inlets by which the pressurizing medium is suppliable to the second subset of the wheel brakes with no switching of the states of the relief valves by which the pressurizing medium is removable from the second subset of the wheel brakes.

8. The method of claim 1, wherein:

the electronically slip-controllable brake system is configured to switch the states of the relief valves by which the pressurizing medium is removable from the second subset of the wheel brakes for the slip control when the disturbance is not determined to exist; and subsequent to the closure of the inlets by which the pressurizing medium is suppliable to the first subset of the wheel brakes, based on the determination of the existence of the disturbance, the slip control of the second subset of the wheel brakes is performed by switching open and close states of only the inlets by which the pressurizing medium is suppliable to the second subset of the wheel brakes with no switching of the states of the relief valves by which the pressurizing medium is removable from the second subset of the wheel brakes.

* * * * *